No. 642,975. Patented Feb. 6, 1900.
T. H. GRIGG.
APPARATUS FOR SHAPING TIRES, FELLIES, &c.
(Application filed Jan. 31, 1899.)
(No Model.) 2 Sheets—Sheet 1.

Fig. 1.ᵃ

Fig. 1.ᵇ

WITNESSES:

INVENTOR
Thomas H. Grigg,
BY John R. Nolan
ATTORNEY.

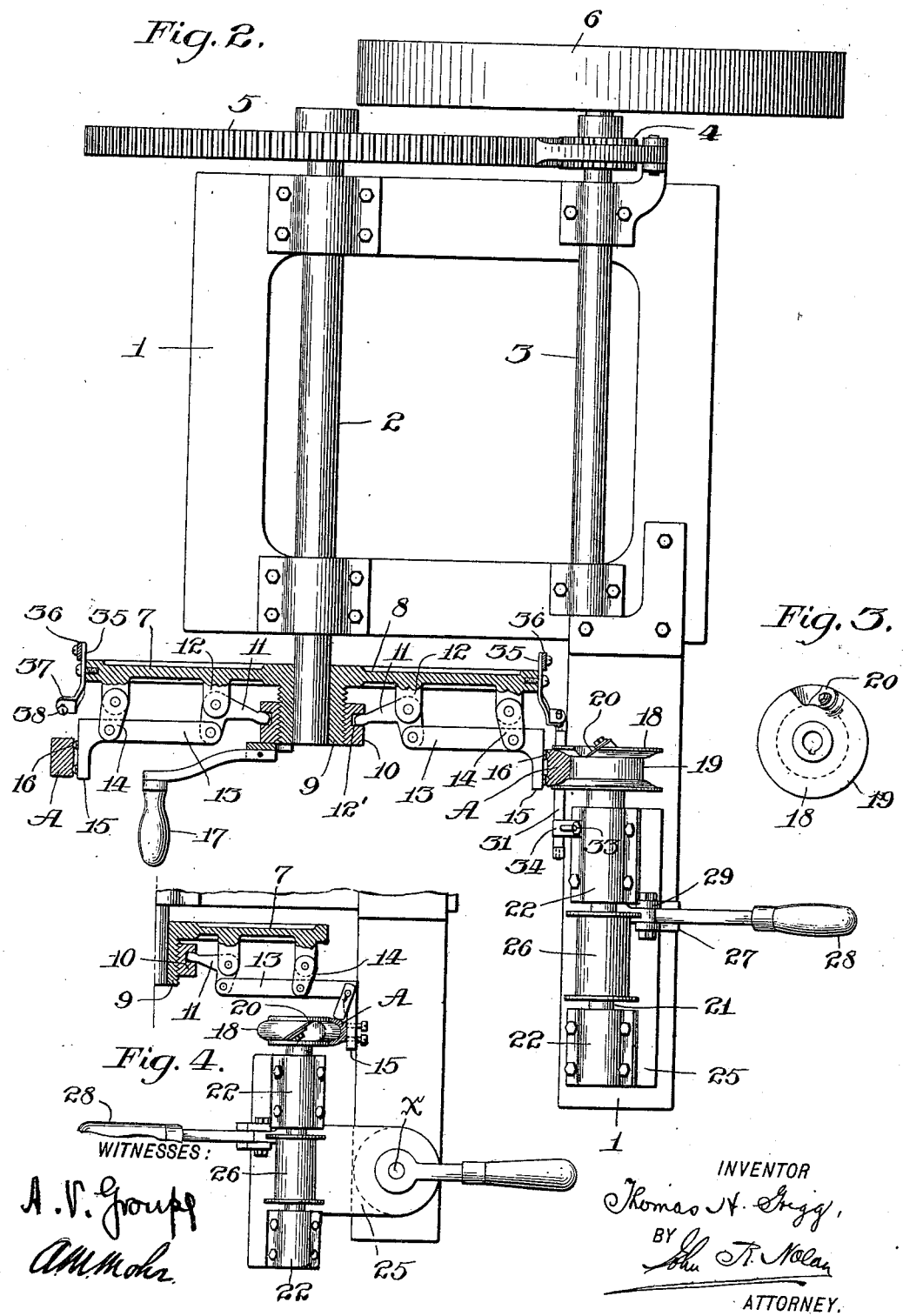

UNITED STATES PATENT OFFICE.

THOMAS H. GRIGG, OF PHILADELPHIA, PENNSYLVANIA, ASSIGNOR TO THE GRIGG SUSPENSION TIRE COMPANY, OF CAMDEN, NEW JERSEY.

APPARATUS FOR SHAPING TIRES, FELLIES, &c.

SPECIFICATION forming part of Letters Patent No. 642,975, dated February 6, 1900.

Application filed January 31, 1899. Serial No. 703,982. (No model.)

*To all whom it may concern:*

Be it known that I, THOMAS H. GRIGG, a citizen of the United States, residing in the city and county of Philadelphia, in the State of Pennsylvania, have invented certain new and useful Improvements in Apparatus for Shaping Fellies, Tires, &c., of which the following is a full, clear, and exact description, reference being had to the accompanying drawings, forming a part of this specification.

This invention relates to apparatus of simple and efficient construction for shaping wheel-fellies, tires, and the like, the same being especially designed for the purpose of imparting the proper cross-sectional form to previously-constructed rings or blanks in the manufacture of the rigid tire set out in my Letters Patent of the United States No. 597,164, dated January 11, 1898, to which reference may be had. Such rings or blanks are preferably produced by winding a strip of wood in several layers or convolutions upon a suitable former-wheel and securely cementing such layers or convolutions together during the operation. A machine for thus constructing the rings or blanks forms the subject of an application for patent filed herewith, Serial No. 703,983.

The present invention comprises various novel features of construction and organizations of parts, which will be hereinafter particularly described and claimed.

Figure 1:
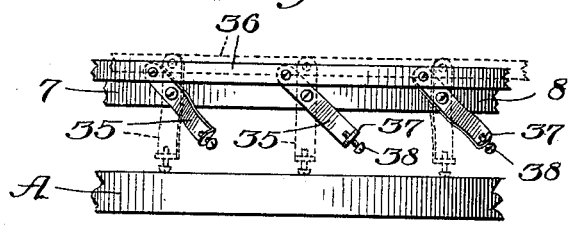
Figure 1:
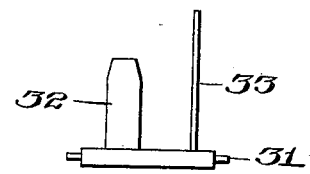
Figure 1:
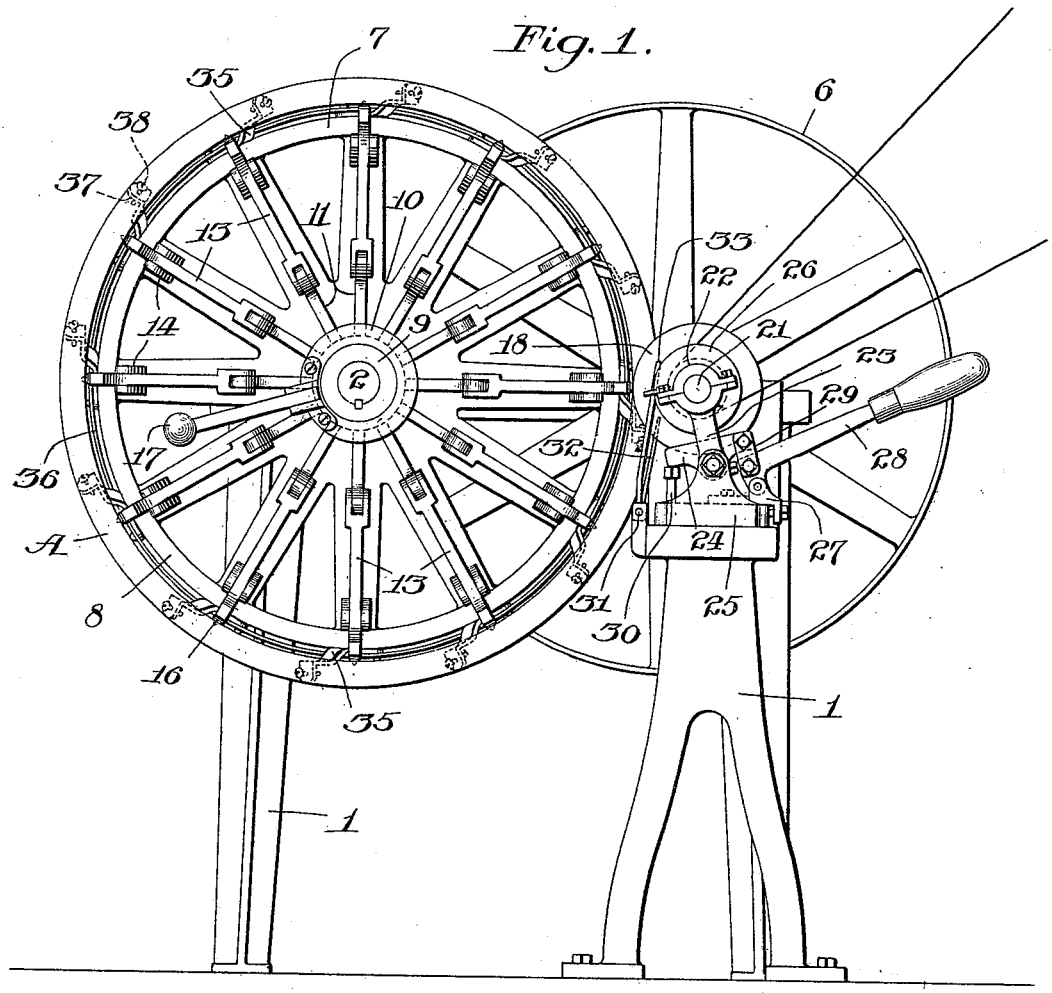

In the annexed drawings, Figure 1 is a side elevation of a machine embodying my invention, the same being represented as in actual operation. Fig. 1$^a$ is a detail in plan showing the swinging side stops for the wooden ring. Fig. 1$^b$ is a detail of clearing device. Fig. 2 is a plan of the machine, showing the clamping-wheel or "chuck" in transverse section. Fig. 3 is an end view of the cutter-head. Fig. 4 is a sectional plan of a modification wherein the cutter is designed to channel the inner side of the ring.

Numeral 1 designates a supporting-frame; 2, the main shaft thereon; 3, a counter-shaft; 4 5, coacting gears on the respective shafts, and 6 a driving-pulley on the coun-ter-shaft.

7 is a clamping head or chuck on the forward end of the main shaft. This head comprises a wheel 8, fast on the shaft and provided with an exteriorly-screw-threaded hub 9, a circumferentially-grooved nut or sleeve 10, fitted to said hub, so as to be movable longitudinally thereon, a series of radially-mounted crank-levers 11, fulcrumed to laterally-projecting lugs 12 on the wheel at points adjacent to the nut or sleeve, into the groove 12′ of which are fitted the inner arms of the levers, and a corresponding series of radial arms 13, pivoted at their inner ends to the outer arms of said levers and pivotally connected at their outer ends with the wheel by links 14, the outer extremities of said arms being provided with lateral extensions 15, which constitute clamping-jaws. These jaws are preferably equipped with pointed studs or teats 16. The screw-nut is furnished with a crank-handle 17, by means of which the nut and its connections may be operated. It will be seen that when the nut is screwed inward the inner arms of the crank-levers will be correspondingly moved thereby, thus simultaneously retracting the arms and their jaws, and that when the nut is moved outward a reverse operation will be effected. The jaws, as will be noticed, are arranged at equidistant points in circular series adjacent to the periphery of the wheel. Hence when they are retracted, as just mentioned, a ring or band A of appropriate diameter may be applied thereto with its inner periphery resting upon the teats, as shown, whereupon by properly turning the crank the arms will be simultaneously actuated to force their jaws uniformly against and throughout the inner side of the ring in a manner to lock it fast on the wheel.

Adjacent to the clamping-head is supported a cutter-head 18, the same comprising a flanged barrel 19, with appropriate blades 20 on the flanges thereof. The form of the working edges of the cutters, as well as the inner faces of the flanges, is governed by that to be imparted to the ring A, in the present instance double ogee, or substantially so, in cross-section. The cutter-head is mounted on a shaft 21, the bearings or boxes 22 for which are carried by swinging arms 23. These arms are affixed to the trunnions of a rocking frame 24, that is supported in a base or bracket 25 on the main frame. On the shaft is a pulley 26, which is driven by a belt from a suitable source of power. Fulcrumed to lugs 27 on the base-bracket is a hand-lever 28, the inner end of which is connected with lugs on the frame 24 by means of links 29, whereby when the arm is raised the frame is tilted to throw the cutter toward and against the work on the clamping-head, and when the arm is depressed the cutter is retracted. On the bracket is a bolt or pin 30, which coacts with the frame to determine the throw thereof when the lever is raised. Supported in suitably-disposed bearings on the bracket is a rock-shaft 31, to which is affixed an upwardly-extending blade 32, that lies within the cutter-head in position to clear therefrom the waste, &c., resulting from the cutting operation. An arm 33, affixed to the shaft and extended loosely through a perforated lug 34 on one of the boxes, maintains the clearer in operative position during the actuation of the cutter-head.

On the periphery of the wheel 8 are fulcrumed at intervals apart transverse levers 35, the outer arms of which are pivotally connected to a band 36, while the inner arms thereof are provided with lips or lugs 37, bearing set-screws 38. It will be obvious that by moving the band the levers may be simultaneously swung on their fulcra. Assuming the clamping-jaws to be retracted, the band is moved to set the arms in the position indicated by the dotted lines in Fig. 1ª, and the set-screws 38 are properly adjusted to serve conjointly as a determinate stop for the opposing edge of the band when it is applied to the jaws. The band having thus been applied, the crank is turned to spread the jaws against the ring and clamp it in place. The band is then moved to swing the levers away from the work, as shown by the full lines in Fig. 1ª. This done, power is applied to the machine, the clamping-head and ring thereon turning as a unit. The operator then grasps the hand-lever and moves the cutter-head steadily against the rotating ring, the cutters thus fashioning the periphery of the ring into the prescribed form. When the operation has been completed, the cutter-head is retracted by actuation of the hand-lever, the jaws are retracted by the proper turning of the crank-handle, and the ring is removed.

While the machine above described is designed to shape the exterior of the ring, it will be understood by reference to Fig. 4 that by slight modification a machine may be constructed to channel or shape the inner side of the ring in the formation of my said patented tire. In this construction the several parts are identical with those of the first-named machine, saving that the jaws are arranged to bear upon the outer instead of the inner surface of the ring, and the supporting-base for the cutter-head, instead of being fixed to the frame, is pivotally mounted thereon, as at x, Fig. 4, to the end that it may be swung around to set the cutter-head against the inner side of the work when the latter has been clamped in place. Obviously the cutter is appropriately shaped to produce in the ring a groove or channel of the requisite form—in the present instance U shape.

I claim as my invention—

1. In a machine of the character described, the combination with the shaft, of a wheel provided with a screw-threaded hub, a series of crank-levers adjacent to said hub, a nut fitted to said hub and engaged with the levers, radial arms provided at their outer ends with laterally-projecting jaws, and pivotally connected at their inner ends with the said levers, links pivotally connecting the outer ends of said arms with the wheel, the cutter-head, and means whereby it may be thrown into and out of action.

2. In a machine of the character described, the combination with a rotary clamping-head, including a circular series of radially-movable jaws adapted to receive and hold a ring or band to be turned, of a series of stops arranged at intervals apart around said head and adjacent the said jaws, and means whereby the said stops may be shifted laterally toward and from the jaws.

3. In a machine of the character described, the combination with a rotary clamping-head, including a wheel and a circular series of radially-movable jaws adapted to receive and hold a ring or band to be turned, of a series of transverse levers on the periphery of said wheel, the inner arms of which levers are provided with adjustable stops, and means connected with the outer arms of said levers for simultaneously moving the same, whereby the said stops may be shifted toward or from the opposing edge of the ring or band applied to said jaws.

4. In a machine of the character described, the combination with a rotary clamping-head, including a wheel, of a series of stop-levers mounted on the periphery of said wheel, at intervals apart and movable toward and from the inner face of said wheel, and a band pivotally connected with said levers.

5. In a machine of the character described, the combination with a rotary clamping-head, a cutter-head adjacent thereto, its shaft, and means whereby the same may be swung toward and from the clamping-head, of a clearer extending into or adjacent to said cutter-head, and comprising an arm or blade and means whereby the same is caused to swing in concert with the cutter-head.

In testimony whereof I have hereunto affixed my signature in the presence of two subscribing witnesses.

THOMAS H. GRIGG.

Witnesses:
ANDREW V. GROUPE,
JOHN R. NOLAN.